United States Patent [19]

McDilda et al.

[11] Patent Number: 5,084,284
[45] Date of Patent: Jan. 28, 1992

[54] CONTAINER FOR REFRIGERATED DOUGH AND METHOD OF FORMING A REFRIGERATED DOUGH PRODUCT

[75] Inventors: Joseph C. McDilda, Brooklyn Park; Michael J. Rice, St. Paul, both of Minn.

[73] Assignee: The Pillsbury Company, Minneapolis, Minn.

[21] Appl. No.: 638,390

[22] Filed: Jan. 7, 1991

[51] Int. Cl.$^5$ .................... B65D 85/00; A21D 10/02
[52] U.S. Cl. .................... 426/128; 426/112; 426/115; 426/122; 426/404; 206/830; 229/202; 229/245
[58] Field of Search ............... 206/830, 630, 631, 634; 426/128, 404, 122, 112, 115

[56] References Cited

U.S. PATENT DOCUMENTS

| | | | |
|---|---|---|---|
| 2,793,126 | 5/1957 | Fienup et al. | 99/172 |
| 2,855,884 | 10/1958 | Magill | 206/830 |
| 3,009,626 | 11/1961 | Johnson | 206/631 |
| 3,035,753 | 5/1962 | Erekson | 426/128 |
| 3,102,818 | 9/1963 | Zoeller et al. | 99/172 |
| 3,144,193 | 8/1964 | Geist et al. | 229/51 |
| 3,220,598 | 11/1965 | Fried et al. | 206/634 |
| 3,356,506 | 12/1967 | Matz et al. | 99/90 |
| 3,397,064 | 8/1968 | Matz | 99/90 |
| 3,506,183 | 4/1970 | Turpin et al. | 229/51 |
| 3,510,050 | 5/1970 | Culley et al. | 229/51 |
| 3,524,401 | 8/1970 | Hosfield et al. | 99/90 |
| 3,669,682 | 6/1972 | Lutz | 99/90 |
| 3,712,534 | 1/1973 | Fienup et al. | 229/51 |
| 3,718,483 | 2/1973 | Davis et al. | 99/182 |
| 3,724,742 | 4/1973 | Henderson | 229/51 |
| 3,782,966 | 1/1974 | Forkner | 426/275 |
| 3,879,563 | 4/1975 | Tucker et al. | 426/128 |
| 3,933,302 | 1/1976 | Reid et al. | 229/51 |
| 3,940,496 | 2/1976 | Turpin et al. | 426/123 |
| 3,972,468 | 8/1976 | Reid | 229/51 |
| 3,981,433 | 9/1976 | Thornhill et al. | 229/51 |
| 4,091,718 | 5/1978 | Thornhill | 93/39.1 |
| 4,093,073 | 6/1978 | Leezer | 206/606 |
| 4,187,137 | 2/1980 | Beauchamp | 156/195 |
| 4,235,341 | 11/1980 | Martin et al. | 206/601 |
| 4,241,834 | 12/1980 | Beauchamp | 206/611 |
| 4,343,427 | 8/1982 | Sansbury | 229/4.5 |
| 4,357,356 | 11/1982 | Joulin | 426/19 |
| 4,381,315 | 4/1983 | Yong et al. | 426/94 |
| 4,493,850 | 1/1985 | Fioravanti | 426/283 |
| 4,526,801 | 7/1985 | Atwell | 426/128 |
| 4,769,245 | 9/1988 | Farrar et al. | 426/106 |
| 4,792,456 | 12/1988 | Katz et al. | 426/551 |

OTHER PUBLICATIONS

Condensed Chemical Dictionary, 10th Ed, Hawkley, p. 316

*Primary Examiner*—Donald E. Czaja
*Assistant Examiner*—Jean L. Aberle
*Attorney, Agent, or Firm*—Kinney & Lange

[57] ABSTRACT

A container for vacuum packing refrigerated dough and a method of forming a refrigerated dough product is disclosed. A method of forming a refrigerated dough product using a spiral wound composite container of the present invention is also disclosed.

32 Claims, 3 Drawing Sheets

CONTAINER FOR REFRIGERATED DOUGH AND METHOD OF FORMING A REFRIGERATED DOUGH PRODUCT

BACKGROUND OF THE INVENTION

The present invention relates in general to methods of preparing bakery doughs and to containers for packaging prepared refrigerated doughs. In particular, it relates to a method of proofing dough adapted for refrigerated storage, an improved container for refrigerated doughs, and a method for forming a dough product utilizing the improved container.

The manufacture of doughs suitable for refrigerated storage and for cooking at a later date is well known. One problem inherent in known refrigerated dough products is that the shelf life of existing products is limited. The dough products are known to degrade over time and lose textural properties. The bacteria levels also increase over time, causing the product to become discolored and spoiled. Exposure of the dough to oxygen over time also causes discoloration and spoilage of the dough. The liquid components of the dough are known to separate and a syrup forms which leaks out of known containers soiling the outer labels. The syrup leakage is particularly objectionable to consumers.

Examples of patents which disclose refrigerated dough compositions are Yong et al. U.S. Pat. No. 4,381,315, Matz U.S. Pat. Nos. 3,356,506 and 3,397,064, Atwell U.S. Pat. No. 4,526,801 and Lutz U.S. Pat. No. 3,669,682.

The Yong et al. U.S. Pat. No. 4,381,315 describes refrigerated dough compositions for forming products with bread-like characteristics and is herein incorporated by reference. During storage of these doughs, pressure within the container builds as a result of gasses generated by the leavening process. Yong discloses that preferred dough compositions for doughs stored under pressure contain between 28 and 36.5 percent by weight water and between 2 and 3.7 percent by weight leavening agents. The doughs are suitable for storing in a container having an internal pressure of between 1 and 25 p.s.i.g.

The Matz U.S. Pat. No. 3,356,506 patent is also representative of refrigerated dough compositions. Examples of dough compositions disclosed in the Matz '506 patent contain between about 2.8 percent and about 3.1 percent leavening by weight of the dough, and about 27 percent by weight water. The dough is placed in a container capable of venting gasses produced during proofing until the dough fills the volume of the can. At that point, the dough plugs the escape path of the gas, and the internal pressure of the container begins to rise.

The Matz U.S. Pat. No. 3,397,064 also discloses refrigerated dough compositions. The biscuit dough composition of Example 1 contains 2.1 percent leavener and 32.8 percent water, by weight. The dough compositions disclosed in the Matz 064' patent are also suitable for packaging and proofing in vented cans which seal when the dough expands to completely fill the volume of the container. Thereafter, the by-product gasses produced as a result of leavening increase the internal storage pressure within the container to between 8 and 16 p.s.i.g.

Atwell U.S. Pat. No. 4,526,801 discloses an improved refrigerated dough composition which when placed in a container generates preferred container pressures of between 2 and 7 p.s.i.g. at 40 degrees Fahrenheit. The disclosed formulations contain between 28 and 36.5 percent by weight water and between 2.0 and 3.7 percent by weight leaveners. The doughs also have as a component a volatilizable edible substance having a vaporization temperature of less than about 200 degrees Fahrenheit. The added component provides higher specific volume upon baking.

The Lutz U.S. Pat. No. 3,669,682 patent discloses a refrigerated dough composition which is resistant to crystalline growth during storage. Dough formulations commonly include a combination of a slow acting leavening acid and an alkaline substance capable of releasing carbon dioxide upon reaction with the leavening acid. The most common system includes sodium acid pyrophosphate and sodium bicarbonate. These leaveners tend to react in the aqueous phase of the dough, forming visible disodium orthophosphate dodecahydrate crystals. This crystal formation most frequently occurs at storage temperatures of from 32 to 50 degrees Fahrenheit. The Lutz patent sought to eliminate the problem of crystal formation by introducing a polyphosphate having an average chain length from about 4 to about 8 to the dough composition.

Dough compositions as the ones discussed above can be either proofed before or after packaging. "Proofing" for purposes of this disclosure is defined as a preliminary heating step in which the dough is at ambient pressure, in which the leavening agents react, expanding the dough by approximately 1 to about 15 percent. After proofing, the dough is further developed by storage in a sealed container at refrigeration temperatures until a point in which the internal pressure of the container has reached a selected equilibrium pressure, and when the dough has reached an equilibrium temperature. During the "developing step" the dough changes in quality including for example texture, density, flavor and crumb consistency.

Proofing of refrigerated doughs is typically accomplished by first packaging the dough in a container which allows gas to escape until the dough expands to a volume sufficient to completely fill the container. The dough is packaged to fill between about 85 and about 99 percent of the available volume, and is then covered with a lid capable of venting gasses. The filled containers are exposed to temperatures ranging from about 70 to about 100 degrees Fahrenheit for a period of about 1 to about 3 hours. By elevating the temperature above ambient temperature, the leaveners act more quickly than if the dough remains at room temperature and at atmospheric pressure.

After the dough has filled the container, proofing is complete. Next, the dough is developed by placing the containers in refrigerated storage for a time sufficient for the internal pressure in the container to build and continue to rise until reaching a target equilibrium pressure of about 18 to about 20 p.s.i.g.

Pressure equilibrium is typically established in between about 8 and about 35 hours, bringing the total amount of time required for processing a prepared refrigerated dough up to between about 9 and about 48 hours. It is not until the above-described proofing and developing steps are complete that the dough can be baked and transformed into a baked good having acceptable quality including the proper texture, taste and density, for example.

There are several disadvantages to raising the temperature of the dough during proofing. Raising the temperature of the dough encourages the growth of microorganisms. Raising the temperature of the dough also requires the use of energy. Heating the dough and maintaining the elevated temperatures takes a great deal of time. Typically, proofing and developing together require from between about 9 and about 48 hours, depending on factors such as the type of product, the proofing temperature, the humidity, and whether the dough is in a container.

Although dough can be proofed before packaging, a common practice in forming refrigerated dough as described in Tucker et al. U.S. Pat. No. 3,897,563 includes placing the dough in a package such as a spiral wound composite can, capping the ends with caps capable of venting gasses, and placing the containers in a proofing chamber. The exposure time to heat is typically between about one and three hours, at 70 to 100 degrees Fahrenheit, depending upon many factors such as the size and shape of the dough and container, and the selected proofing temperature, for example. When the volume of the dough fills the container, proofing may be discontinued. After proofing, the packaged dough is "developed" by cooling to refrigeration temperatures and storing the product until the internal pressure of the dough container reaches equilibrium. What is meant by "developed" dough for purposes of this disclosure is dough which undergoes a chemical change which alters characteristics of the dough such as structure, texture, taste and crumb characteristics, for example. To develop the dough, the proofed containers are placed in refrigerated storage for at least 8 additional hours to allow the leaveners in the dough to continue to act, until the leaveners reach an internal container equilibrium pressure of between about 18 and about 20 p.s.i.g.

One known method of accelerating proofing is to select a chemical leavening system for the dough which elevates the internal container pressure during proofing. Katz et al. U.S. Pat. No. 4,792,456 discloses a dough composition suitable for proofing which after heating and subsequent refrigerated storage results in an elevated container pressure of about 20 p.s.i.g. The chemical leavening agent employed in this dough composition includes a mixture of glucono-delta-lactone and baking soda.

One known spiral wound container construction useful in proofing as discussed in Tucker includes capped ends capable of allowing oxygen entrapped in the product and present in the headspace of the container prior to proofing and gasses generated during proofing to escape to the atmosphere until the dough expands and fully occupies the volume of the container. This type of prior art end cap design is illustrated in FIG. 1.

FIG. 1 shows a cross-sectional view of a known end cap construction used for forming containers capable of venting gas. The container wall 10 is multilayered (or composite) and is substantially cylindrical. The cap 12 has an inner lip 14 and an integrally formed outer lip 16 which is folded inwardly onto itself such that the outer lip 16 is reinforced. After capping the container wall 10, the portion of the wall located between the inner lip 14 and the outer lip 16 is compressed. This construction allows gasses to vent from within the container, but does not allow the dough composition to escape. When the dough expands and comes into contact with the end cap, the dough plugs the gas escape path, and pressure builds within the container.

Several container designs having the above-mentioned venting feature are constructed to withstand the internal pressure generated during developing. One such container is described in Culley et al. U.S. Pat. No. 3,510,050. The container body includes a composite, multilayer spiral wound cylindrical structure having substantially flat, circular end covers. The end covers are conventionally applied and seamed. Culley et al., Column 6, lines 34-35. The container has a core layer which is formed from a relatively stiff paper can-grade paperboard. The disclosed container is formed by known spiral winding methods. Adhesively bonded to the inner surface of the core layer is a thin membrane layer. Adhesively bonded to the exterior surfaces of the core layer is a label layer which also protects the core layer from damage due to exposure to high humidity environments, for example.

The core layer includes a helical, longitudinal butt joint. Tensile members are provided which are formed of a material which will burst upon application of concentrated force. The most preferred tensile members are longitudinal strips which are positioned over and straddle the butt joint on the inner and outer surfaces. The tensile strips are attached by means of a hot melt adhesive applied on either side and spaced apart from the butt joint. The butt joint itself is not adhesively bonded. When the outer surface of the container is struck against a rigid corner surface, the tensile strips rupture, and the butt joint separates. Upon grasping opposite ends of the can and twisting in opposing directions, the can opens allowing the pressure to be released and the product to escape from the side of the can.

Non-bonded helical butt joints are used in several other known package configurations designed to withstand internal pressure. Another example is shown in Reid U.S. Pat. No. 3,972,468. This patent discloses a composite container having a core layer including an unbonded helical butt joint, an inner impermeable layer adhesively bonded to the core layer, a reinforcing strip adhesively bonded to the outer surface of the core layer covering the butt joint, and an outer layer adhesively bonded to the reinforcing strip and core layer. The adhesive bond between the outer layer and reinforcing strip is stronger than the bond between the reinforcing strip and core layer. When the label is removed, the reinforcing strip remains adhered to the label. The butt joint then separates. Upon grasping opposite ends of the container and twisting in opposing directions, the dough is released from the container. The internal pressure within the container assists in rupturing the reinforced butt joint.

The ability of a helical longitudinal butt joint to separate in part depends on the placement of the helical longitudinal seam of the inner membrane layer. By placing the membrane seam close to the butt joint, the butt joint separates more easily. Beauchamp U.S. Pat. No. 4,241,834 discloses a quick-open refrigerated dough container. The helical seam of the inner layer is closely spaced from the butt joint. Thornhill et al. U.S. Pat. No. 3,981,433 also discloses an inner layer seam closely spaced to a butt joint in the core layer.

The use of a container which is not air-tight has certain disadvantages. One problem with such a container is that the openings create a path for oxygen exchange. Additional oxygen encourages the growth of microorganisms which cause the dough to become discolored and spoil prematurely. Refrigerated doughs stored in such breathable containers therefore have a shorter shelf life than what is theoretically possible of refrigerated doughs.

As the dough in a vented container ages, water and other soluble substances separate from the mixture forming a syrup. Because the containers are under a positive pressure during storage, this syrup can escape from between the end caps and container wall and drip onto the outer surface of the container. The presence of syrup on the outer surface of the can is unacceptable to consumers.

The problem of extending the shelf life of baked goods has been extensively studied. The Davis et al. U.S. Pat. No. 3,718,483 discloses a method of preparing storage-stable bakery products. Dough or batter may be placed in a metal can and hermetically sealed under a vacuum. Drawing a vacuum of at least about 19.9 inches of mercury (absolute) on the uncooked contents of the can facilitates leavening, and creates sufficient capacity for gas formation during cooking. The leavened product then is completely cooked in the hermetically sealed can and the can remains sealed until the product is consumed.

The Davis patent also discloses a dough composition adapted for vacuum packing and cooking in a hermetically sealed can. The water content of cake batters must be between 10 and 20 percent of the batter by weight. The water content of doughs must be about 35 percent by weight. The amount of leaveners present in the cake and bread formulations ranged from between 0.5 percent and 1.0 percent by weight.

Other methods of preserving dough-based products are known. Joulin U.S. Pat. No. 4,357,356 discloses a method of producing a bread product from dough including the step of partially baking the dough, packing the partially cooked dough in hermetically sealed packaging under a vacuum, and sterilizing the partially baked dough in the package.

In addition to vacuum packaging partially cooked products, it is also known to vacuum package products after pasteurization or sterilization. For example, it is known to vacuum package concentrated fruit juices after sterilization. One such process is disclosed in Sansbury U.S. Pat. No. 4,343,427.

The Sansbury '427 reference also describes a composite can adapted for packaging hot juice. The composite can includes a spiral wound core layer, an inner impervious layer and an outer label layer. The core layer is preferably formed from paperboard and includes a helical skive joint having adjacent faces which are adhesively bonded with a strongly adhering adhesive to prevent rupture of the can. A "skive joint" for purposes of this disclosure is a joint which is cut through the cylinder wall in a direction other than radially outward and substantially perpendicular to a point along a main cylindrical axis. The inner layer of the can structure is adhesively bonded to the inner surface of the core layer and has a helical seam which is spaced substantially apart from the skive joint to further strengthen the can. The thickness of the core layer is such that the can is capable of withstanding an internal vacuum caused by cooling of the hot liquid after the can is sealed. The container disclosed in Sansbury is hermetically sealed.

SUMMARY OF THE INVENTION

A method of proofing dough is disclosed which includes the step of forming a dough adapted for use as a refrigerated dough. The dough is preferably between about 27 and about 36 weight percent water and between about 1.0 and about 3.0 percent leaveners. The dough is placed in a container suitable for holding a vacuum, is evacuated and then hermetically sealed. The dough is then developed by chilling the sealed dough and allowing the sealed dough to rest for an amount of time sufficient for the internal pressure of the container to reach an equilibrium pressure. It was surprisingly discovered that by drawing a vacuum on the container, it was not necessary to proof the dough. Even more surprisingly, it took significantly less time to develop the dough to the point of pressure equilibrium. By reducing the temperature of the dough during development, it was also discovered that the quality of the product could be improved by reducing spoilage and contamination. Furthermore, the process of the present invention is less expensive than conventional proofing and developing because the process saves the energy required in proofing.

A novel container for proofing refrigerated dough is also disclosed. The container is strong enough to withstand an internal vacuum, and a positive internal pressure and is capable of being hermetically sealed. The container has a paperboard core layer which includes a helical skive joint which is weakly bonded with an adhesive capable of releasing upon application of a concentrated force to an outer surface of the container. The container has structural features of a very durable and tough container, but also has a weakened skive joint to permit the user to apply pressure to the outer surface of the container to cause the skive joint adhesive to release, allowing the product to exit from the side seams of the container. The internal pressure in the container also aids in opening such a container.

The container of the present invention also includes an impermeable inner layer which in the preferred embodiment is of a multilaminate construction. The helical seam of the impermeable layer is closely spaced to the skive joint to allow rupture of the package when it is desired to access its contents.

A method of proofing refrigerated dough using the container of the present invention is also disclosed. The method includes forming a dough adapted for use as a refrigerated dough product, placing the dough in a container of the present invention, pulling a vacuum, sealing the container while under vacuum, and developing the dough under refrigerated conditions until the container reaches the selected internal equilibrium pressure.

DETAILED DESCRIPTION OF THE PREFERRED EMBODIMENTS

Figure 1:
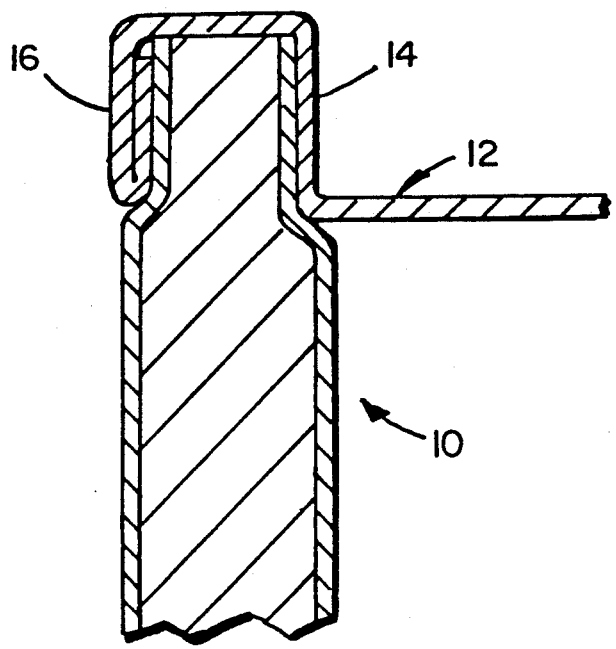
FIG. 1 is a cross-sectional view of a prior art composite can end cap.

The present invention is a novel method of forming a refrigerated dough product, a novel container for packaging refrigerated dough, and a method of forming a refrigerated dough product utilizing the novel container.

It was surprisingly discovered that by placing a quantity of dough suitable for refrigerated storage into a container, pulling a vacuum on the container and then sealing the container, that the known proofing step typically accomplished by heating the container could be substantially eliminated. It was even more surprisingly discovered that refrigerated doughs processed according to this method developed under refrigerated conditions more rapidly. It is believed that the method of the present invention develops dough in ½ to 8 hours rather than the 9 to about 48 hours required with conventional proofing and developing.

Although the mechanism of this discovery is not precisely understood, it is believed that by initially drawing a vacuum on the dough, entrapped gasses in the dough expand, causing the dough to expand to a volume which could be obtained by conventional proofing. It is believed that product quality is improved because the oxygen which was once in the container headspace and entrapped in the dough is greatly reduced. The presence of oxygen is known to encourage microbial growth which leads to discoloration of the dough product and spoilage. It is believed that microorganisms which are known to flourish at proofing temperatures are suppressed sufficiently by oxygen deprivation and by maintaining cooler dough temperatures during developing.

It is also possible according to the present method to increase the capacity of existing equipment by reducing the time necessary to develop the dough. The present process also saves on energy expense by eliminating an energy-intensive heating step, and a subsequent cooling step. The cooling step referred to here is the step of lowering the dough temperature from proofing temperature to ambient temperature. Of course, the present method requires that the dough temperature be lowered to a temperature effective to inhibit microbial growth, preferably refrigeration temperatures of between about 40 and about 50 degrees Fahrenheit. The method of the present invention is also believed to improve the quality of the refrigerated dough product and extend the product shelf life.

One known refrigerated dough composition is disclosed in Atwell U.S. Pat. No. 4,526,801. Atwell U.S. Pat. No. 4,526,801 is herein incorporated by reference. The following is a tabulation of the preferred formulation of the commercially available Pipin' Hot brand loaf refrigerated dough disclosed in Atwell S. U.S. Pat. No. 4,526,801:

| Ingredient | Weight Percent of Dough |
| --- | --- |
| flour | 47-58 |
| water | 28-36 |
| saccharides | 4-10 |
| salt | 1.0-1.5 |
| flavoring | 0.1-7.0 |
| emulsifiers | 0.02-1.1 |
| dough conditioners | 0.004-0.25 |
| bicarbonate of soda | 0.7-1.2 |
| leavening acid | 1.3-2.5 |
| shortening | 2-25 |
| edible alcohol | 0-2 |
| calcium carbonate | 0-1 |

The dough product formed according to this formula is representative of known refrigerated dough formulas. What is meant by "refrigerated dough" is a dough composition suitable for storage for extended periods of time at a temperature at or below 50 degrees Fahrenheit.

It was discovered that for achieving the best results with the present method, it is necessary to reduce the leavening amounts over the known range disclosed in the Atwell '801 reference to between about 1.0 and about 3.0 weight percent of the dough. The preferred amount of leaveners are present between 1.5 and about 2.1 percent for biscuit dough, and between about 1.5 and about 2.8 percent for bread dough. It was discovered that the experimental equipment used limited the speed in which the dough could be loaded into the vacuum apparatus, and therefore more leavening was required to compensate for the release of leavening gasses during loading than what is theoretically sufficient. It is believed that with the proper equipment, leavening amounts of as low as about 1.0 weight percent would be sufficient to develop the dough.

It was also discovered that the most preferred moisture content of the dough is between about 27 percent and about 32 percent by weight of the dough. Although a moisture content of up to 36 percent by weight would form a suitable refrigerated dough, it was discovered that by lowering the moisture content slightly, a more suitable vacuum-packaged product could be formed.

Figure 2:
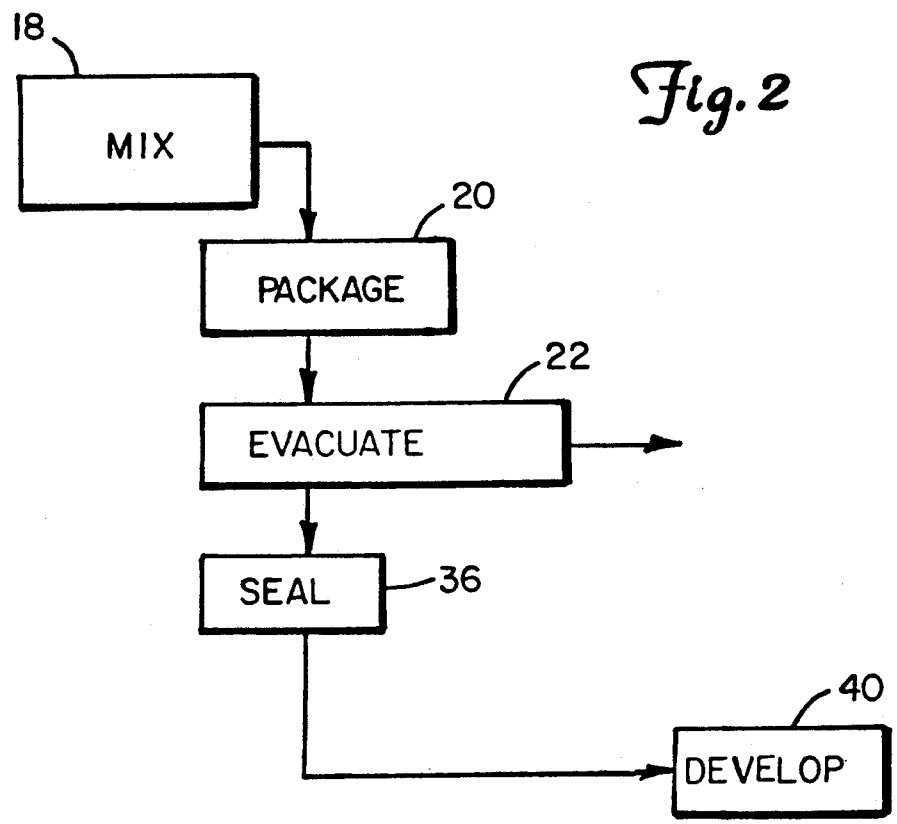
FIG. 2 is a schematic diagram of a preferred process of forming a refrigerated dough product of the present invention.

FIG. 2 is a schematic diagram of a preferred method of forming a refrigerated dough product according to the present invention. The first step includes forming a dough composition 18 suitable for vacuum packaging. It was discovered that refrigerated dough formulations similar to the composition described above having leavening amounts that are preferably between 1.0 and 3.0 weight percent and a water content between about 27.0 and 36.0 weight percent are most suitable for practicing the preferred method.

The dough ingredients are mixed according to the most preferred method at ambient temperature and atmospheric pressure. Alternatively, one or more of the ingredients may be heated or cooled prior to or during mixing. The components are mixed according to known methods.

Next, a package capable of withstanding a vacuum and which is adapted for being hermetically sealed is selected. The package must be capable of withstanding suitable vacuum to expand the selected dough. The preferred package is capable of withstanding between about 5 and about 25 inches of mercury (absolute), with a most preferred capacity of withstanding a 5 inches of mercury (absolute) vacuum.

Steel cans of the type used to can vegetables are examples of suitable containers. Other examples are plastic, glass or other metallic containers such as aluminum cans. Initial testing for reducing the preferred method to practice was conducted using steel cans of the type used to can vegetables. Although metal cans were used in the experiments, it was discovered that other container configurations are more preferable. The most preferred container configuration is described below. The critical attributes of the selected container to practice the method of the present invention include a capacity to be hermetically sealed, a capacity to withstand a vacuum, and a capacity to withstand a selected positive pressure.

A quantity of dough adapted for refrigerated storage is selected which before leavening fills between about 85 percent to about 99 percent of the volume of the selected container. The next step is placing the dough into the container 20, the container having an opening large enough to insert the dough product. The dough according to the most preferred method is at room temperature. The dough however may be at a higher or lower temperature.

Next, the container is evacuated 22 in a known manner. The vacuum removes a majority of the oxygen surrounding the dough and is believed to draw a portion of the entrapped gasses within the dough structure out of the dough. The most preferred vacuum levels range from about 5 to about 25 inches of mercury (absolute).

Experiments were conducted to determine the amount of vacuum required to expand the dough to fill the volume of the containers at ambient temperatures. In general, it was discovered that the lower the vacuum (for example, closer to absolute vacuum), the more rapidly the dough expanded and the higher the product quality was after extended periods of refrigerated storage. It was also discovered that it was not practical with conventional vacuum packaging equipment to draw vacuums lower (meaning closer to an absolute vacuum) than 5 inches of mercury.

It was discovered that the best results were achieved with the preferred dough composition by drawing an initial vacuum of about 5 inches of mercury (absolute). The product expanded to completely fill the volume of the container within about 5 seconds. In contrast to the 1 to 3 hours required of conventional proofing with heat, the time savings associated with this step is substantial.

Experiments conducted at other vacuum settings also produced acceptable results. For example, at a vacuum of about 25 inches of mercury (absolute), the dough expanded to almost completely fill the majority of the volume of the container within about 10 seconds. Many other tests were conducted at pressures between 5 and 25 inches of mercury. Each test yielded acceptable results. Vacuum levels above about 25 inches of mercury were insufficient to reduce proofing time to within the desired range. Vacuum levels above about 25 inches of mercury also did not produce enough force and or remove enough oxygen to allow the dough to fully expand and fill the container.

Figure 3:
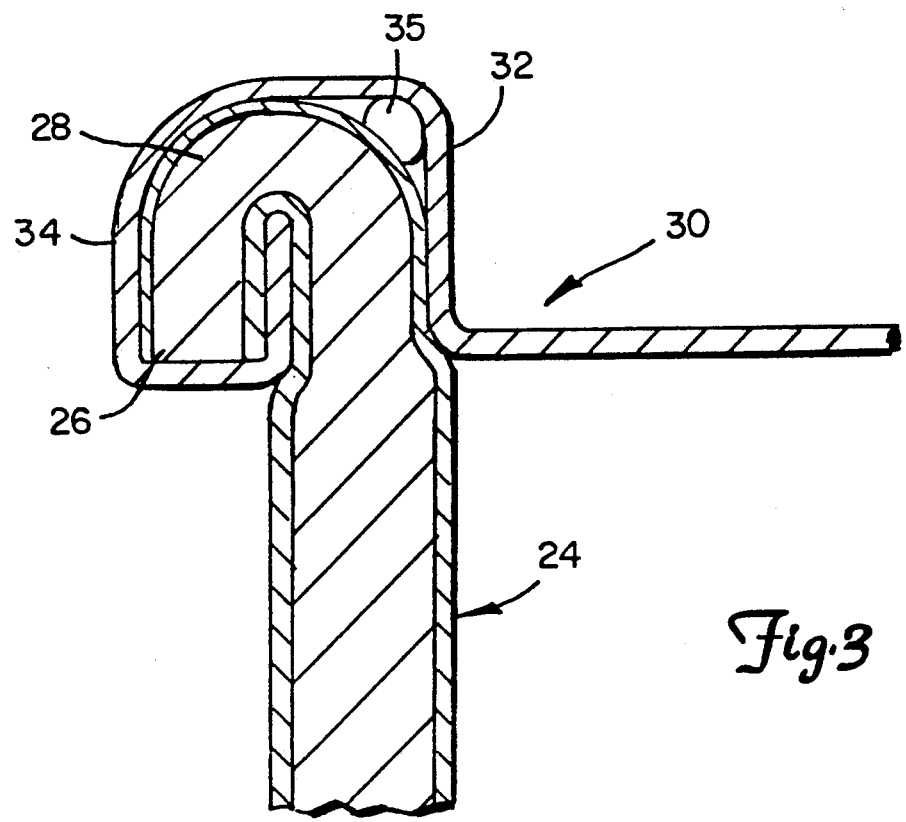
FIG. 3 is a cross-sectional view of a double crimped composite can end cap.

The container lid is next placed over the opening and the can is hermetically sealed 36. Sealing the steel container was accomplished by a double crimping method. The containers were vacuum packaged according to known methods. A Rooney seamer was used in the experiments to double crimp the end caps of the can to the body of the can. FIG. 3 is a cross-sectional view of a double crimped can end. The container wall 24 is substantially cylindrical. The upper edge 26 of the container wall is folded radially outward, forming a lip 28. The end cap 30 has an inner lip 32 and an outer lip 34 which wraps around both inner and outer surfaces of the lip 28 of the container wall. When the inner and outer lips 32 and 34 are forced together, the upper edge 26 and container wall are forced together, and the container wall is compressed. On the underside of the end cap 30 between the inner lip 32 and outer lip 34 is a ring-shaped bead 35 of a soft polymeric material which assists in maintaining a vacuum-tight seal on the container wall 24. The bead 35 may be formed of any suitable material which is approved for use with foods.

Although double crimping is a most preferred method, any method of sealing the container which prevents the influx of gas would be suitable to practice the preferred method. According to the most preferred method, a Rooney sealer can be used to double crimp the lid to the can. Alternatively, the container lid may be positioned over the opening, a vacuum pulled and the container then sealed.

Although the method of the present invention requires a vacuum pulling step 20 as well as a sealing step 36, it is to be understood that both steps may be practiced simultaneously by utilizing the proper vacuum packaging equipment. According to the most preferred method, vacuum is pulled 20 prior to sealing 36.

The next step in practicing the present invention is to develop 40 the dough. Developing according to the present method includes first cooling the dough to a temperature effective to inhibit microbial growth, and then allowing the dough in the sealed container to rest at cool temperatures for between about 30 minutes and about 8 hours. The best quality results can be achieved at temperatures of between about 40 degrees and about 50 degrees Fahrenheit, where the dough is above freezing but below temperatures which encourage microbial growth.

It was surprisingly discovered that by hermetically sealing formed dough having leaveners present in amounts between about 1.0 and about 3.0 percent by weight of the dough and most preferably between 1.0 and 2.8 weight percent of dough in a container, that conventional proofing conducted at elevated temperatures and requiring 1 to 3 hours of time was virtually eliminated. By selecting an effective vacuum setting, it is therefore possible to expand the dough to substantially fill the container in about 10 seconds or less.

Although doughs having leaveners present in an amount between about 1.0 and about 3.0 percent by weight of the dough are suitable to practice the present method, it was discovered that it is more preferable to maintain the leavener amounts between about 1.5 and about 2.8 weight percent for bread-type dough compositions. For biscuit dough compositions, the preferred amount of leaveners are between about 1.5 and about 2.1.

The preferred moisture content of the dough is between about 27 and about 36 percent by weight. Although doughs within this moisture range would form suitable doughs to practice the present method, it was discovered that the most preferred water content was about 28 percent by weight. By selecting the most preferred moisture and leavener amounts, and by pulling a vacuum of about 5 inches of mercury, the time required to expand the dough was reduced to less than 5 seconds.

It is believed that the novel method of the present invention accomplishes proofing in less than or equal to 10 seconds without requiring heat rather than proofing according to known methods which require 1 to 3 hours of proofing and the addition of heat.

According to the most preferred method, the leaveners are selected and are present in quantities effective to produce a refrigerated equilibrium pressure of between about 18 and about 20 p.s.i.g. in the container at the completion of developing. The leaveners at this pressure and temperature range are sufficiently slow to react so that the resulting pressure within the container remains approximately constant until opened.

The ultimate container pressure is selected to maximize product performance, to make the container rigid enough to withstand the weight of pallets of product when stacked and must deliver a pressure release effective to aid in opening the container. It was discovered that the most preferable pressure for refrigerated doughs is about 20 p.s.i.g. Product performance characteristics such as dough texture, density, crumb consistency and flavor for example are effected by the selected ultimate container pressure.

It was surprisingly discovered that the step of developing the dough 40 in a chilled atmosphere after drawing a vacuum was greatly accelerated if first expanded by means of drawing a vacuum. In comparison to the typical 9 to 48 hours required for doughs which have been conventionally proofed and developed to reach the selected ultimate can pressure, according to the present method, the equilibrium pressure can be achieved in between ½ and 8 hours, which is a substantial time savings.

The chilled product may then be stored in refrigerated storage, transported or sold. Not only does expanding the dough according to the present method occur more rapidly than with prior art methods, but by eliminating the conventional method of proofing, it is not necessary to cool the dough from the elevated proofing temperature down to ambient temperature. Elimination of the chilling step also saves substantial time and could potentially increase the capacity of refrigerated dough production equipment. Of course, it is still necessary to lower the dough temperature from ambient temperature to refrigerated temperatures in order to develop the dough and form a refrigerated dough product with an extended shelf life.

There are other advantages besides the above-mentioned energy and time savings in vacuum packaging refrigerated doughs. Because the container must be hermetically sealed, liquid syrup which forms in the container as the dough ages remains sealed in the container. With the vented cans of the prior art, syrup was forced out of the pressurized can, soiling the outer surfaces of the container.

Another advantage is in raw material savings. The amount of leaveners can be reduced to between about 1.0 and about 3.0 percent by weight of the dough, which is a smaller quantity of leaveners than what is present in many known refrigerated dough compositions.

Perhaps the most important advantage of the present invention has to do with product quality. It is well known that microbial growth is accelerated at elevated temperatures. By eliminating the need to raise the internal temperature of the dough, and by eliminating the majority of available oxygen, microbial growth is not encouraged and a higher quality product with an improved shelf life can be expected. Hermetically sealed ends also eliminate oxygen exchange and any paths for microbial contamination after packaging.

After chilling 40, the dough may be removed from the container and prepared for cooking. One method of removal is to open the container and turn the can over. The dough may then be cooked to form a baked good. The most preferred form of cooking includes baking the dough in a conventional oven. Alternatively, the dough may be prepared in a convection oven, a toaster oven, a microwave oven or according to any other known form of cooking.

Figure 4:
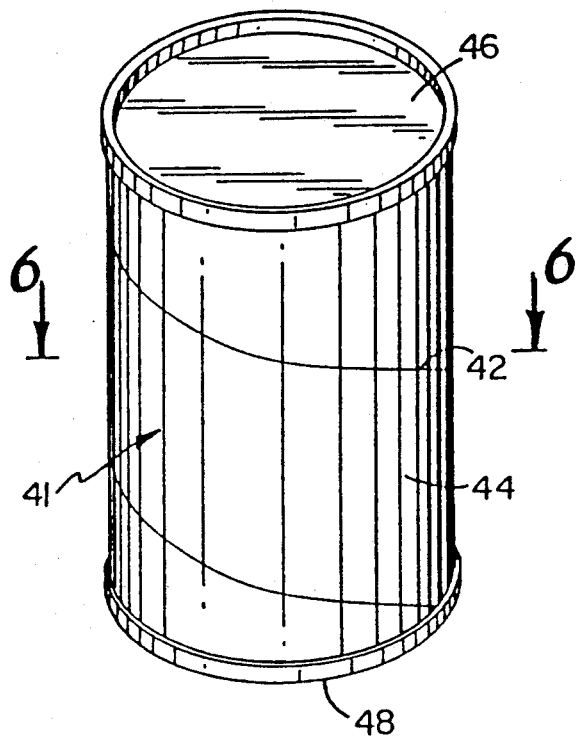
FIG. 4 is a perspective view of a preferred embodiment of the dough container of the present invention.

Although it was discovered that a steel can is a suitable container to practice the present method, it was discovered that it is possible to form a composite can as shown in FIG. 4 which is capable of being hermetically sealed, which is capable of withstanding internal vacuums of as low as 5 inches of mercury (absolute), which is capable of withstanding an internal pressure in excess of about 30 p.s.i.g. and which can be easily opened.

The composite can 41 of the present invention is formed of a central core layer, an inner impermeable liner and an optional outer label layer (not shown). The composite can 41 has a helical joint 42 extending from the outer surface 44 of the central core layer through the inner surface (not shown) which is substantially longitudinal. The composite can 41 of the present invention also includes a pair of hermetically sealed ends 46 and 48 which in the most preferred embodiment are made from steel. The ends 46 and 48 are double crimped to the composite can wall in the most preferred embodiment. The can wall is defined by the central core layer and inner impermeable liner.

Figure 5:
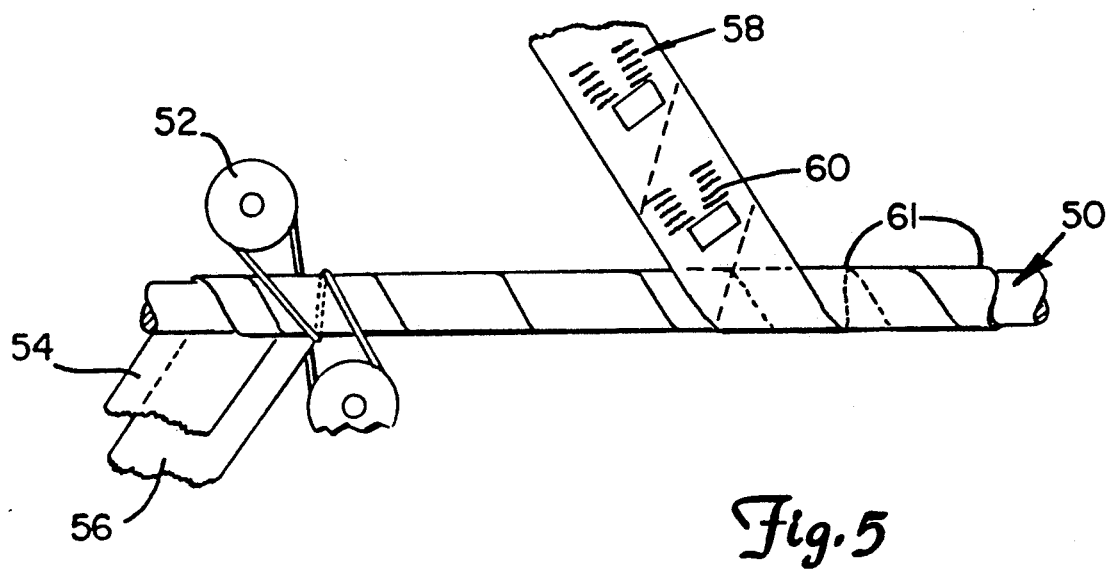
FIG. 5 is a schematic view of a process of forming the preferred container of the present invention.

The composite can 41 of the present invention can be formed according to a preferred process shown in FIG. 5. FIG. 5 shows a composite can winder 50 driven by at least one belt drive motor 52. As the motor causes the belt to rotate, the belt deposits a continuous strip of impermeable material 54 onto the winder at an angle with respect to a plane substantially perpendicular to the cylindrical axis of the can winder. Also deposited onto the winder is a continuous strip of core material 56 which is adhesively coated on the surface facing the impermeable layer. In the preferred embodiment, an adhesive is applied to the surface of the core layer 56 facing the impermeable material 54. As the belt rotates, both the impermeable strip 54 and the core strip 56 are deposited and joined, forming a continuous cylinder. A helical joint defined by the slightly overlapping edges of the impermeable strip 54 are spaced slightly apart from the joint defined by the edges of the core strip 56. The helical joint of the impermeable strip 54 preferably includes a heat sealed anaconda fold.

In one preferred embodiment, the impermeable layer 54 is formed from a laminate including kraft paper and aluminum foil. In another embodiment, the layer 54 is formed of polypropylene plastic. In still another preferred embodiment, the impermeable layer 54 is a laminate of plastic, aluminum, plastic, then kraft paper, in that order. The impermeable layer is selected such that it is substantially impermeable to gasses and liquids.

The core strip 56 is preferably formed from heavy paperboard having a thickness of at least 0.018 inches. The core layer 56 must be thick enough to provide structural support for withstanding the selected vacuum. It was discovered that paperboard having a preferred thickness of 0.021 inch is suitable for withstanding vacuum environments as low as 5 inches of mercury (absolute).

Optionally, a third strip which can consist of a label strip 58 may be adhesively applied to the outer surface of the formed cylindrical tube. The label layer 58 typically contains printed matter 60 and serves to protect the core layer 56 from moisture. One preferred label material is plastic film. Another preferred label material is a 40 pound kraft paper laminate having a 0.0003 inch aluminum foil moisture barrier layer As the cylindrical tube is formed, the tube is cut into discrete lengths 61. An end cap (shown in FIG. 4) is preferably placed onto one end prior to inserting dough (not shown).

Figure 6:
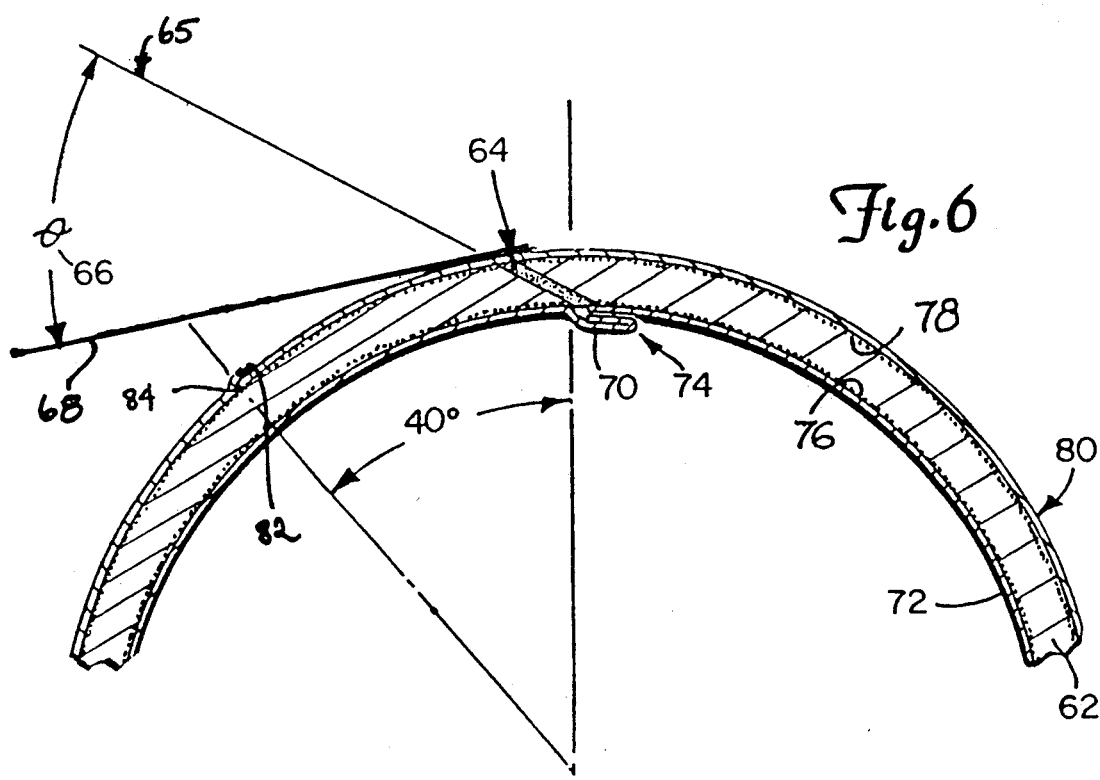
FIG. 6 is a cross-sectional view of the dough container of the present invention, taken along line 6—6 as shown in FIG. 4.

FIG. 6 is a cross-sectional view of the preferred container of the present invention taken along line 6—6 as shown in FIG. 4. It should be understood that the relative thickness of each of the layers is greatly exaggerated in FIG. 6.

The skive joint 64 in the preferred embodiment is cut at an angle Θ 66 defined by the intersection of a first reference line 65 which lies in a plane defined by cross-section 6—6 as shown in FIG. 4, the plane being substantially perpendicular to a cylindrical axis extending centrally from a first end of the tubular body to an opposite end, and a second reference line 68. The second reference line 68 also lies in the same plane as reference line 65, and passes substantially through the opposing faces of the skive joint 64 which is about 3.5 degrees from a line 68 tangent to the outer edge of the joint. Although in the preferred embodiment angle Θ 66 is about 3.5 degrees, angles between about 1 degree and about 15 degrees also form suitable skive joints. Modified skive joints having a step feature would also work.

A novel aspect of the container of the present invention is illustrated in FIG. 6. The core layer 62 has a skive joint 64 which in the preferred embodiment is formed or cut into the paperboard strip 56 before winding onto the composite can winder 50 (shown in FIG. 5). The skive joint unlike any of the known prior art containers is adapted to be opened by the application of an external force to the outer surface of the container, yet is strong enough to withstand a vacuum environment. The skive joint 64 in the preferred embodiment is cut at an angle Θ 66 which is about 3.5 degrees from a line 68 tangent to the outer edge of the joint. Although in the preferred embodiment angle Θ 66 is about 3.5 degrees, angles between about 1 degree and about 15 degrees also form suitable skive joints. Modified skive joints having a step feature would also work.

It was surprisingly discovered that the combination of dextrose and water is a suitable adhesive for forming the weakly bonding skive joint. Adhesive is applied to the faces of the skive joint 64 and when the composite can winder 50 forms the paperboard into a tube, the faces of the skive joint are weakly bonded together. It was discovered that a mixture of between about 30 and about 70 percent dextrin adhesive in water was sufficient to form a weakly bonding adhesive. The most preferred composition for bonding the skive joint includes about 50 percent water and about 50 percent dextrin. Although a mixture of dextrin and water is used, many other adhesives would also be suitable.

Another aspect of the present invention is in the placement of a substantially impermeable seam 70 of the impermeable layer 72 relative to the skive joint 64. If the seam is positioned too far from the skive joint 64, then when force is applied to the external surface of the container, the seam 64 may not rupture. It was discovered that by placing the seam 70 between about 0 and about ½ inch from the skive joint 64, that the seam 70 failed at the selected time. The most preferred seam 70 includes an edge 74 formed into an anaconda fold that overlaps the opposite end. The seam 70 may be unfolded or may be folded as shown in FIG. 6.

The most preferred embodiment of the container of the present invention includes a label layer 80 (also shown in FIG. 6). Also included is an adhesive layer 76 between the impermeable layer 72 and the core layer 62, and another adhesive layer 78 between the label layer 80 and the core layer 62.

Optionally, the label layer 80 can include a pull tab 82 for easy removal of the label prior to opening the container. The core layer 62 is sufficiently strong and therefore the label layer 80 does not function to add strength. Therefore, the location of the helical seam 84 of the label layer 80 can be located anywhere relative to the radial position of the skive joint 64. The most preferred location is about 40 degrees opposite the skive joint, however.

In order to use the container of the present invention, suitable dough is formed and a selected quantity is packed and vacuum sealed into the container. After the drawn vacuum expands the dough, the sealed dough is placed in a low temperature environment of between about 40 and about 50 degrees Fahrenheit, with a preferred temperature of about 45 degrees Fahrenheit. The dough is permitted to develop for a period of ½ to 8 hours. The dough may then be stored or used. When the container is to be used, the label is first removed by grasping the pull tab 82 and peeling the label off of the container.

Then, pressure can be applied to the outside surface 44 of the can by conventional methods such as by tapping the can against a hard edged surface, by pressing against the skive joint with an implement such as a spoon, or by pushing against the skive joint with a finger. The application of such force in combination with the internal pressure breaks the seal within the container and releases the weak adhesive in the skive joint. Opposite ends of the container are then grasped and twisted in opposite directions to release the product. The composite can of the present invention is also capable of withstanding internal pressures in excess of about 30 p.s.i.g. As with the other known methods of packaging refrigerated dough, the pressure within the can during developing and storage is positive. It should be understood that during the novel developing method described above, eventually a positive internal pressure builds within the container.

Although the mechanism of the present invention is not precisely understood, it is believed that drawing a vacuum expands the gasses entrapped in the dough, causing the dough to rapidly expand. The present invention also improves product quality by eliminating oxygen from the product and from within the headspace of the can, inhibiting microbial growth. Eliminating the heating of the dough also does not encourage microbial growth.

Although the present invention has been described with reference to preferred embodiments, workers skilled in the art will recognize that changes may be made in form and detail without departing from the spirit and scope of the invention.

What is claimed is:

1. A spiral wound container for refrigerated dough comprising:
 a substantially tubular body portion having enough strength to withstand a vacuum, and having a longitudinal helical skive joint, the skive joint having adjacent faces joined with an adhesive capable of releasing the faces upon applying pressure to an outer surface of the body portion;

an inner liner adhesively attached to an inner surface of the tubular body portion, the liner being substantially impermeable to liquids and gasses, the inner liner having a longitudinal helical overlapping seam positioned proximate the skive joint; and at least one end cap adapted for hermetically sealing at least one end of the tubular body portion.

2. The container of claim 1 and further comprising an outer label layer adhesively bonded to an outer surface of the tubular body portion.

3. The container of claim 1, wherein the substantially tubular body portion has a cylindrical axis extending centrally from a first end of the tubular body to an opposite end, wherein an angle defined by a line passing between a substantial portion of a pair of skive joint faces and a line tangent to an outer surface of the tubular body portion and intersecting an outer edge of the skive joint, both lines lying in a plane substantially perpendicular to the cylindrical axis, is an angle other than 90°.

4. The container of claim 3 wherein the angle is between about 1 degree and about 15 degrees.

5. The container of claim 3 wherein the angle is about 3.5 degrees.

6. The container of claim 1 wherein the skive joint adhesive comprises a mixture of dextrin and water.

7. The container of claim 1 wherein the skive joint adhesive is between about 30% and about 70% water, and the balance is dextrin.

8. The container of claim 1 wherein the skive joint adhesive comprises about 50 percent water and about 50 percent dextrin.

9. The container of claim 1 wherein the inner liner comprises kraft paper.

10. The container of claim 1 wherein the inner liner comprises a metallic layer.

11. The container of claim 1 wherein the inner liner comprises a plastic.

12. The container of claim 1 wherein the cap is double crimped to a container wall including at least the tubular body and adhesively bonded inner liner.

13. The container of claim 1 wherein the overlapping seam is spaced up to about ½ inch from the skive joint.

14. The container of claim 1 wherein the tubular body is formed from paperboard having a thickness between about 0.018 inches and about 0.030 inches.

15. The container of claim 1 wherein the container comprises two end caps.

16. A method of forming a refrigerated dough product comprising the steps of:
forming a dough composition having a water content between about 27 and about 36 percent by weight, and having leavening agents present in amounts between about 1.0 and about 3.0 percent by weight of the dough;
placing an amount of the dough in the container of claim 1;
drawing a vacuum on the dough;
sealing the dough in the container at a pressure effective to expand the dough; and
developing the dough by cooling the dough to a temperature sufficient to inhibit microbial growth and for a time sufficient for the pressure within the container to reach a selected equilibrium pressure.

17. The method of claim 16 wherein the selected equilibrium pressure is between about 18 and about 20 p.s.i.g.

18. The method of claim 16 wherein the dough is developed for between about ½ hour and about 8 hours.

19. The method of claim 16 wherein a vacuum between about 5 inches (absolute) and about 25 inches (absolute) of mercury is pulled on the container prior to sealing.

20. The method of claim 16 wherein the water content of the dough is between about 27 and about 29 weight percent of the dough.

21. The method of claim 16 wherein the water content of the dough is about 28 percent by weight.

22. The method of claim 16 wherein the leavening amounts are present between about 1.0 weight percent and about 2.8 weight percent of the dough.

23. The method of claim 16 wherein the amount dough placed in the container is between about 85 percent and 99 percent of the volume of the container.

24. A method of forming a refrigerated dough good comprising:
forming a dough adapted for refrigerated storage comprising flour, sugar, shortening, salt, between about 1.0 and about 3.0 weight percent leavener, and between about 27 and about 36 weight percent water, the balance comprising conventional ingredients;
positioning a quantity of the dough in a container adapted for withstanding a vacuum;
drawing a vacuum on the container at a vacuum sufficient to proof the dough without the addition of heat;
sealing the container for an amount of time sufficient to expand the dough to substantially fill the volume of the container; and
developing the dough by lowering the temperature of the dough to a temperature which inhibits microbial growth, and maintaining the container sealed at the selected temperature for an amount of time sufficient for the internal pressure in the container to reach equilibrium.

25. The method of claim 24 wherein the amount of time to expand the dough is between slightly greater than 0 and up to about 10 seconds.

26. The method of claim 24 wherein vacuum between about 5 and about 25 inches of mercury (absolute) is drawn on the container.

27. The method of claim 24 wherein the container is sealed for at least ½ hour at refrigeration temperature.

28. The method of claim 24 wherein developing is complete in up to eight hours from when a vacuum was initially applied.

29. The method of claim 24 wherein the dough is maintained at between about 40 and about 50 degrees Fahrenheit during developing.

30. The method of claim 24 wherein the dough temperature is between about 65 and about 75 degrees Fahrenheit at the time vacuum is drawn on the container.

31. A method of accelerating the preparation of refrigerated dough comprising the steps of:
providing a dough composition adapted for use as a refrigerated dough having between about 27 and 36 weight percent water, and between about 1.0 and 3.0 weight percent leavener;
placing a quantity of dough in a container capable of withstanding a vacuum environment and being hermetically sealed;
drawing a vacuum on the dough;

sealing the dough in a container at a vacuum sufficient to cause the leaveners to expand the volume of the dough without requiring the use of heat; and developing the dough by lowering the dough temperature enough to inhibit microbial growth, and maintaining the hermetic seal on the container for a time sufficient for the container pressure to reach a selected equilibrium value.

32. The method of claim 29 wherein the dough during developing is maintained at a temperature between about 40 and about 50 degrees Fahrenheit.

* * * * *